United States Patent
Sartain et al.

(10) Patent No.: US 8,847,969 B2
(45) Date of Patent: Sep. 30, 2014

(54) METHOD AND APPARATUS FOR PROVIDING LOCAL SCREEN DATA TO A SINK DEVICE

(75) Inventors: Daryl G. Sartain, Cedar Park, TX (US); Daniel A. Ivanciw, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 195 days.

(21) Appl. No.: 13/327,079

(22) Filed: Dec. 15, 2011

(65) Prior Publication Data

US 2013/0155086 A1    Jun. 20, 2013

(51) Int. Cl.
 *G09G 5/39* (2006.01)
 *G06F 13/00* (2006.01)
 *G09G 5/36* (2006.01)

(52) U.S. Cl.
 USPC .......................... 345/531; 345/558; 345/537

(58) Field of Classification Search
 None
 See application file for complete search history.

(56) References Cited

U.S. PATENT DOCUMENTS

| | | | |
|---|---|---|---|
| 7,404,023 B1 * | 7/2008 | Kaszynski | 710/240 |
| 7,570,270 B2 * | 8/2009 | Payson et al. | 345/558 |
| 7,636,834 B2 * | 12/2009 | Tang et al. | 711/219 |
| 8,432,408 B2 * | 4/2013 | Shamarao | 345/558 |
| 2008/0266454 A1 * | 10/2008 | Lin et al. | 348/547 |
| 2012/0320072 A1 * | 12/2012 | Chang | 345/531 |

* cited by examiner

*Primary Examiner* — Joni Richer
*Assistant Examiner* — Yi Wang
(74) *Attorney, Agent, or Firm* — Faegre Baker Daniels LLP (57) ABSTRACT

A method and apparatus is provided for providing local screen data of a source device, such as a personal computer, to a sink device, such as a television, game console, or home theatre system, at a rate determined by the sink device. In one example, the method and apparatus responds to requests from the sink device to provide local screen data by serving the local screen data to the sink device from a circular buffer. The local screen data is written to the circular buffer in FIFO order based on the requests from the sink device, and read from the circular buffer based on the requests.

20 Claims, 10 Drawing Sheets

METHOD AND APPARATUS FOR PROVIDING LOCAL SCREEN DATA TO A SINK DEVICE

BACKGROUND OF THE DISCLOSURE

The disclosure relates generally to a method and apparatus for providing local screen data to a sink device.

Consumers of digital media content such as movies, photographs, and music desire the ability to easily experience the content on any of a variety of devices, regardless of where the content is stored. In a typical home setting, a consumer acquires media content via the internet or by using devices such as cameras and video recorders, and stores the media content on a personal computer, the camera or video recorder, a phone, a tablet computing device, or other storage device ("source device") attached to a wired or wireless network (e.g., a home network). Many consumers desire to experience the stored media content on a device other than the source device because of limitations of the playback equipment of the source device (e.g., PCs have small displays and inferior audio components). Accordingly, many digital media players ("sink devices") exist that are capable of locating media content stored on a networked source device, permitting the user to select desired content through a graphical user interface ("GUI"), and playing back and rendering the selected content using the equipment of the sink device. Examples of such sink devices include televisions, stereos, home theatre systems, wireless monitors, and game consoles, to name a few.

In 2003, in response to a lack of interoperability of the wide variety of source devices and sink devices, the Digital Living Network Alliance ("DLNA") organization was established to enhance the compatibility among components of home network systems. The DLNA issues design guidelines and industry-level standards for equipment manufacturers to support seamless sharing of media content through home networks. As it evolved, the DLNA established a basis for home network interoperability by formulating design guidelines based on various widely used open standards, such as HTTP, UPnP, XML and MPEG. According to one DLNA standard, sink devices employ a "pull model" transfer protocol, described more fully below, for receipt of media content from source devices.

Figure 1:
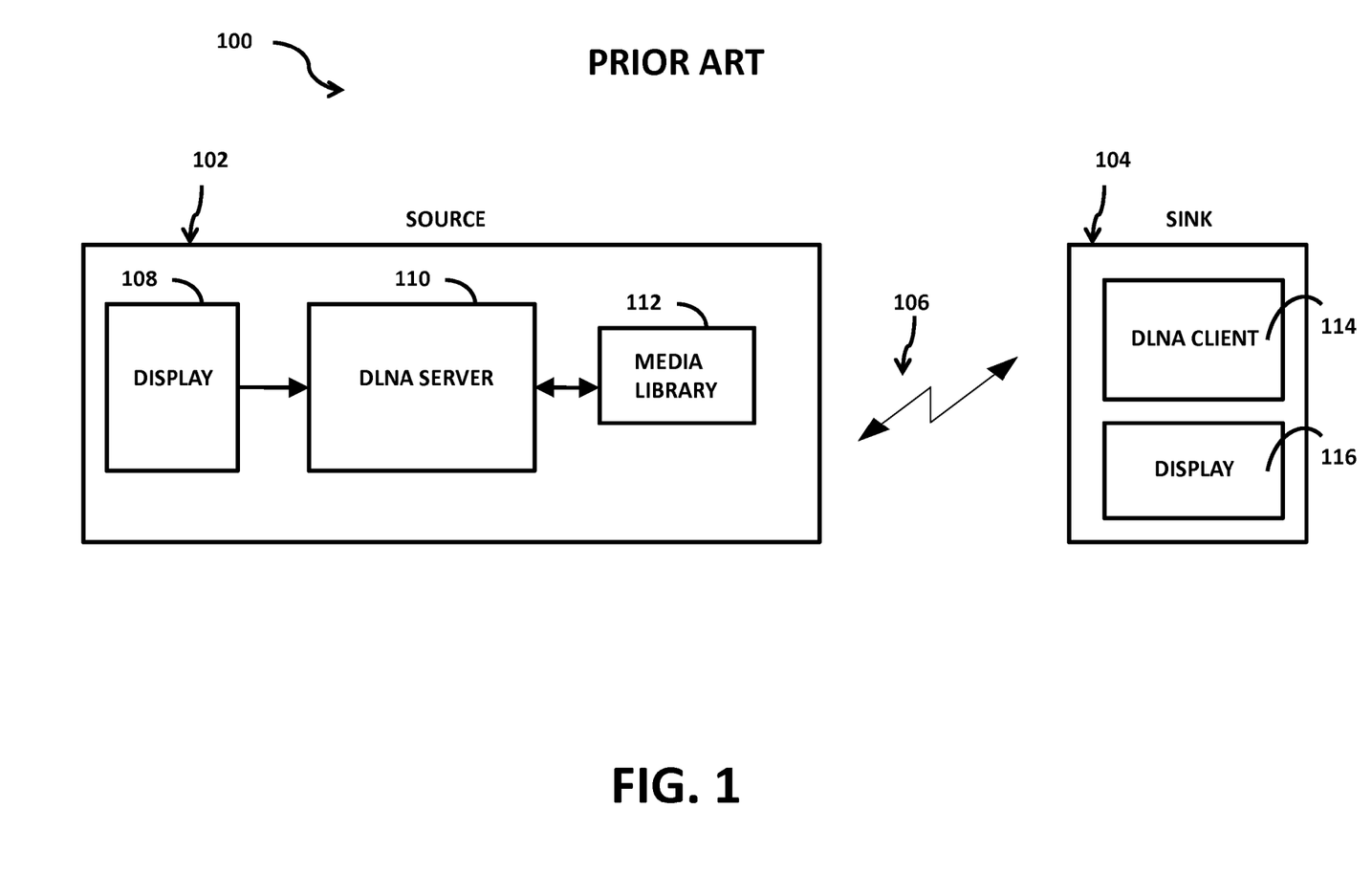
FIG. 1 is a block diagram illustrating one example of a prior art system for communicating media content from a source device to a sink device.

FIG. 1 depicts a prior art system wherein the sink device employs a pull model protocol. As shown, system 100 includes a source device 102, a sink device 104, and a wireless network 106. In this example, source device 102 includes a display 108, a DLNA server 110, and a media library 112. Sink device 104 includes a DLNA client 114 and a display 116. Using the pull model, sink device 104 connects to source device 102 via network 106, requests specific media content stored in media library 112, and demands streaming of the content over network 106 by DLNA server 110 at a rate determined by DLNA client 114. DLNA client 114 processes and displays the received content on display 116.

While the pull model is acceptable for receiving media files stored in media library 112 (i.e., media content which can be read and served from beginning to end at whatever consumption rate sink device 104 demands), it is incompatible with receipt of live content, such as sharing real-time content of display 108 of source device 102, including cursor movements and other user interactions ("local screen data," sometimes referred to as "wireless device content"). While existing source devices can serve continuous media files at a consumption rate demanded by sink devices employing the pull model, such source devices cannot serve such local screen data. As such, a wide variety of conventional sink devices cannot be used to view local screen data generated at source devices.

An update to the DLNA standard specifications enables the use of push model data delivery. However, this new standard is not widely adopted and does not enable "push data" to existing DLNA solutions in the market. As such, while a source device can serve local screen data to sink devices designed or adapted to receive such data, it cannot serve local screen data to the vast number of legacy sink devices employing the DLNA pull model protocol.

Accordingly, there exists a need for an improved method and apparatus for providing local screen data to sink devices at a consumption rate determined by the sink devices in order to address one or more of the above-noted drawbacks.

SUMMARY OF EMBODIMENTS OF THE INVENTION

According to one embodiment of the present disclosure, a method of providing local screen data to a sink device comprises responding to requests from the sink device to provide local screen data at a rate determined by the sink device by serving the local screen data to the sink device from a circular buffer. In one aspect of this embodiment, responding to requests further comprises controlling writing the local screen data to the circular buffer in FIFO order based on the requests and controlling reading of the local screen data from the circular buffer based on the requests. In another aspect of this embodiment, responding to requests further comprises capturing the local screen data from a display device, compressing the captured local screen data, and formatting the compressed local screen data. In yet another aspect of this embodiment, serving the local screen data comprises maintaining a desired latency between local screen data written to the circular buffer and local screen data read from the circular buffer.

In another aspect of this embodiment, responding to requests further comprises interpreting a read pointer from a media server in communication with the sink device. In a further feature of this aspect, interpreting a read pointer comprises determining whether the sink device has requested to continue receiving current local screen data, stop receipt of the local screen data, pause receipt of the local screen data, receive local screen data preceding the current local screen data, or receive local screen data following the current local screen data. According to this feature, interpreting a read pointer comprises responding to a request to stop receipt of the local screen data by discontinuing writing local screen data to the circular buffer. In one variation according to this feature, interpreting a read pointer comprises responding to a request to pause receipt of the local screen data by continuing to increment an internal read pointer associated with the circular buffer and continuing to write local screen data to the circular buffer. In an alternative variation according to this feature, interpreting a read pointer comprises responding to a request to pause receipt of the local screen data by maintaining a location of an internal read pointer associated with the circular buffer and continuing to write local screen data to the circular buffer. Further according to this feature, interpreting a read pointer comprises responding to a request to receive local screen data preceding the current local screen data by decrementing an internal read pointer associated with the circular buffer. Still further according to this feature, interpreting a read pointer comprises responding to a request to receive local data following the current local screen data by incrementing an internal read pointer associated with the circular buffer.

In still another aspect according to this embodiment, interpreting a read pointer comprises determining a frame rate of consumption of the sink device from the read pointer and managing writing of local screen data to the circular buffer based on the frame rate. In a further feature of this aspect, managing writing of local screen data comprises increasing the frequency of writing fully decodable frames of local screen data to the circular buffer.

Another embodiment of the present disclosure provides a computer-readable storage medium storing instructions that, when executed by a processor in a source device, cause the processor to respond to requests from a sink device to provide local screen data at a rate determined by the sink device by serving the local screen data to the sink device from a circular buffer. In one aspect of this embodiment, the instructions, when executed by the processor, further cause the processor to control writing the local screen data to the circular buffer in FIFO order based on the requests and control reading of the local screen data from the circular buffer based on the requests. In another aspect of this embodiment, the instructions, when executed by the processor, further cause the processor to capture the local screen data from a display device, compress the captured local screen data, and format the compressed local screen data. In yet another aspect of this embodiment, the instructions, when executed by the processor, further cause the processor to maintain a desired latency between local screen data written to the circular buffer and local screen data read from the circular buffer. In still another aspect of this embodiment, the instructions, when executed by the processor, further cause the processor to interpret a read pointer from a media server in communication with the sink device.

In another aspect of this embodiment, the instructions, when executed by the processor, further cause the processor to determine whether the sink device has requested to continue receiving current local screen data, stop receipt of the local screen data, pause receipt of the local screen data, receive local screen data preceding the current local screen data, or receive local screen data following the current local screen data.

In another aspect of this embodiment, the instructions, when executed by the processor to interpret the read pointer, further cause the processor to determine a frame rate of consumption of the sink device from the read pointer and manage writing of local screen data to the circular buffer based on the frame rate. According to one feature of this aspect, the instructions, when executed by the processor to manage writing of local screen data to the circular buffer, further cause the processor to increase the frequency of writing fully decodable frames of local screen data to the circular buffer.

Yet another embodiment of the present disclosure provides an apparatus for providing local screen data to a sink device, comprising a local screen data control system including a circular buffer and a controller operative to respond to requests from the sink device to provide local screen data at a rate determined by the sink device by making the local screen data available to the sink device from a circular buffer. This embodiment further comprises a processing module, wherein the controller is further operative to control writing of the local screen data from the processing module to the circular buffer in FIFO order based on the requests, and control reading of the local screen data from the circular buffer based on the requests. In one aspect of this embodiment, the processing module is operative to capture the local screen data from a display device, compress the captured local screen data, and format the compressed local screen data. In another aspect of this embodiment, the controller is further operative to maintain a desired latency between local screen data written to the circular buffer and local screen data made available to the sink device from the circular buffer. In yet another aspect of this embodiment, the controller is further operative to respond to requests by interpreting a read pointer from a media server in communication with the sink device. In still a further aspect of this embodiment, the controller is further operative to interpret the read pointer by determining whether the sink device has requested to continue receiving current local screen data, stop receipt of the local screen data, pause receipt of the local screen data, receive local screen data preceding the current local screen data, or receive local screen data following the current local screen data. In another aspect of this embodiment, the controller is further operative to interpret the read pointer by determining a frame rate of consumption of the sink device from the read pointer, and managing writing of local screen data from the processing module to the circular buffer based on the frame rate.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Briefly, in one example, a method and apparatus for providing local screen data of a source device, such as a personal computer, to a sink device, such as a television, game console, or home theatre system, at a consumption rate determined by the sink device includes interpreting requests for local screen data from the sink device to control write operations of processed local screen data to a circular buffer in FIFO order and to control read operations of the local screen data stored in the buffer to maintain a desired latency between the written data and the read data. When a sink device, such as a receiver that operates according to the DLNA pull model protocol, requests local screen data from a source device, a media server of the source device provides a read pointer to the method and apparatus according to the disclosure, indicating the request for local screen data and identifying the receiver as a receiver that must receive data at a consumption rate determined by the receiver. In response, a processing module of a local screen data control system of the source device according to the present disclosure captures local screen data from a display of the source device, compresses and formats the data, and writes the processed local screen data to the circular buffer in FIFO order. As the media server updates the provided read pointer in accordance with requests from the sink device, a controller of the local screen data control system interprets the read pointers and controls the writing of processed local screen data to the buffer and the reading of the processed local screen data from the buffer by the media server to accommodate the consumption rate required by the sink device.

In another example, the method and apparatus enables viewing of local screen data in a manner similar to a conventional digital video recorder ("DVR"). In this example, the size of the circular buffer may be increased to store historical local screen data. The controller of the local screen data control system interprets the read pointers from the media server to determine the mode of operation requested by the sink device. For example, the sink device may request to stop receiving local screen data, to pause receipt of local screen data, to receive local screen data preceding the current local screen data (i.e., a rewind mode to view historical local screen data), or to receive local screen data following the current local screen data (i.e., a fast-forward mode to view previously rewound local screen data stored in the buffer). As local screen data is, by definition, live content, a fast-forward mode of operation can only be supported to the point that the live local screen data is being read from the buffer.

The controller responds to a request to stop receipt of the local screen data by discontinuing writing local screen data to the circular buffer. In this example, the controller responds to a request to pause receipt of the local screen data by maintaining a location of an internal read pointer associated with the circular buffer and continuing to write local screen data to the circular buffer. In embodiments that do not store historical local screen data, the controller responds to a request to pause receipt of the local screen data by continuing to increment an internal read pointer associated with the circular buffer and continuing to write local screen data to the circular buffer. Continuing with the example wherein historical local screen data is maintained, the controller responds to a request to receive local screen data preceding the current local screen data by decrementing an internal read pointer associated with the circular buffer. Finally, assuming local screen data has previously been rewound for playback, the controller responds to a request to receive local data following the current local screen data by incrementing an internal read pointer associated with the circular buffer.

Among other advantages, for example, the method and apparatus permits communication of local screen data to a vast number of legacy sink devices which could not otherwise receive local screen data because the communication protocol they use requires receipt of content at a consumption rate determined by the sink devices. While such legacy sink devices can receive media files from source devices at consumption rates determined by the sink devices (i.e., in the pull model), they cannot receive local screen data using conventional techniques. The method and apparatus further permits, in one embodiment, flexibility of playback by supporting multiple playback modes as described above. Other advantages will be recognized by those of ordinary skill in the art.

Figure 2:
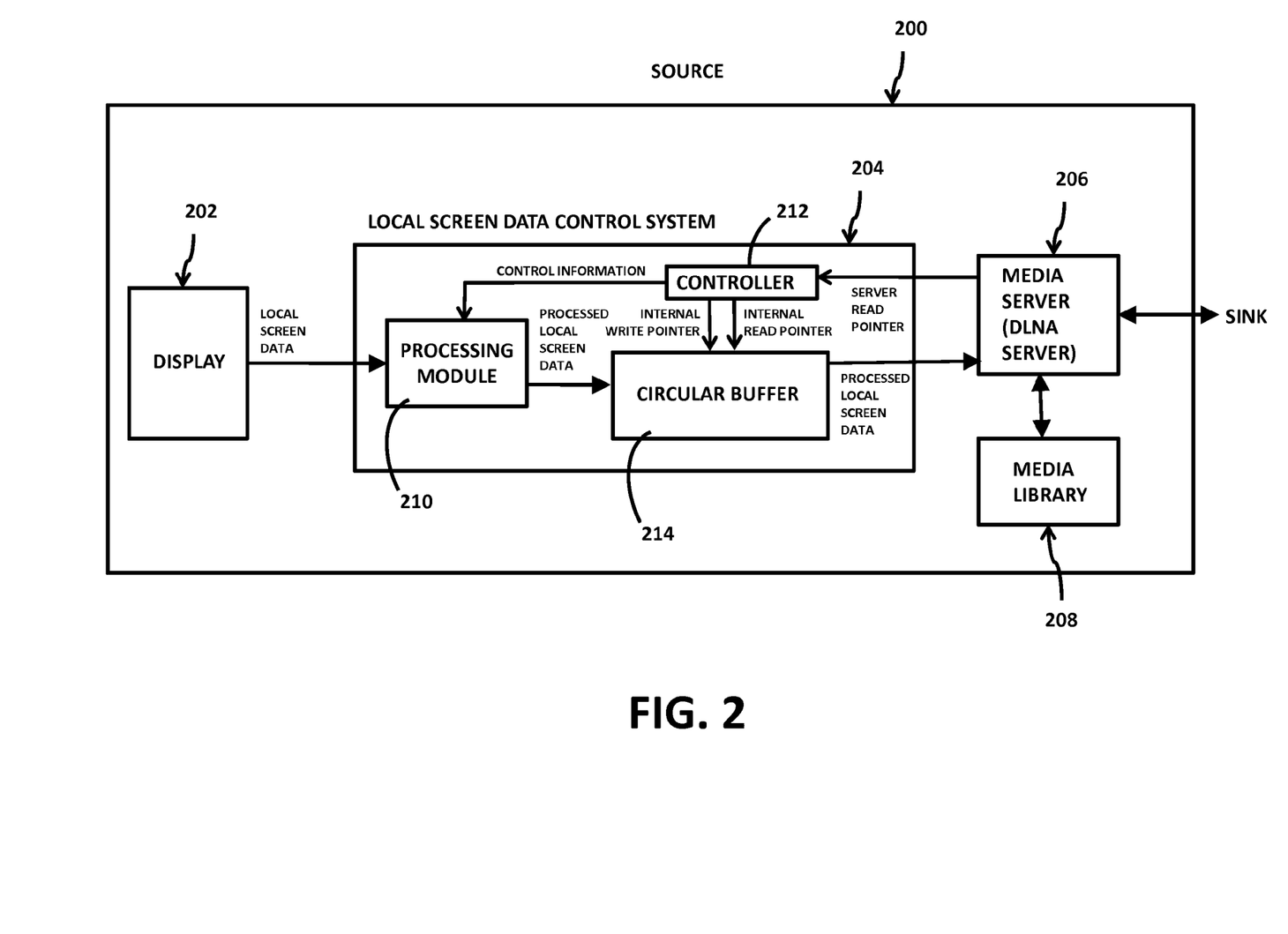
FIG. 2 is a block diagram illustrating one example of an apparatus for providing local screen data to a sink device.

FIG. 2 illustrates one example of a source device 200 for providing local screen data to a sink device. Source device 200 may be any suitable device, for example, a laptop computer, desktop computer, or other source device as listed above. In general, source device 200 includes a display 202, a local screen data control system 204 (hereinafter, "system 204"), a media server 206, such as a DLNA server, and a media library 208. As will be understood by those skilled in the art, display 202 may be integrated with source device 200 or in wired or wireless communication with source device 200. Similarly, media library 208 may be integrated with source device 200 or in wired or wireless communication with source device 200.

System 204 generally includes a processing module 210, a controller 212, and a circular buffer 214. Processing module 210 is implemented using one or more microprocessors and associated circuitry and control logic and software. Processing module 210 performs known functions associated with processing local screen data acquired from display 202, such as capturing the local screen data, compressing the captured data according to one or more of a variety of conventional compression techniques, and formatting the compressed data according to one or more of a variety of conventional digital media formatting techniques. Controller 212 is implemented in software executed by one or more processors of source device 200. Circular buffer 214 is a data structure that, in one embodiment of the disclosure, uses a single, fixed-sized memory buffer including a plurality of storage locations. As is further described below, the storage locations of buffer 214 are continuously overwritten with the most recent local screen data. Conceptually, buffer 214 can be viewed as a ring, having no real beginning or end. In one implementation, frames of local screen data are written to storage locations of buffer 214 as they are processed. When all of the storage locations of buffer 214 are full, the storage location containing the oldest frame of local screen data is overwritten with the most recently processed frame of local screen data. This process of overwriting the oldest frame of local screen data with the most recently processed frame of local screen data is continued. In this manner, buffer 214 functions as a first-in-first-out ("FIFO") buffer, but because it is conceptually a circular data structure, it has the advantage of not requiring frames of data to be shifted each time one frame is read, as is the case for non-circular FIFO buffers.

As will be described in greater detail below, in operation source device 200 receives a request from a sink device for access to content available from source device 200. In the example described herein, sink device is a conventional sink device that employs a pull model transfer protocol such as that provided by the DLNA standard. It should be understood, however, that the teachings of the present disclosure are applicable to any pull model transfer protocol employed by a sink device. The request for content is transmitted to source device 200 in any conventional manner (e.g., over a wire or via a wireless connection or network). The request is received by media server 206 which responds by providing an inventory of media content available for sink device to receive. According to the present disclosure, the inventory will include all available media files stored in media library 208 and another object corresponding to local screen data. In one embodiment, this object is presented to the sink device as simply another file available for consumption. In the example described herein, the object is referred to as ScreenCap file. As is described below, however, ScreenCap file is actually not a sequential, conventional media file, but instead represents the continuously updated contents of buffer 214 with processed local screen data.

Next, the sink device provides an indication of the user's selection of content. If the user selected a media file stored in media library 208, then media server 206 simply serves the file according to conventional methods. If, on the other hand, the user selects ScreenCap file, then media server 206 provides a server read pointer directed to ScreenCap file to controller 212. In one embodiment of the disclosure, system 204 interprets this read pointer as a command to begin processing local screen data for reading by media server 206 (i.e., to begin constructing ScreenCap file). In another embodiment, system 204 continuously operates in the background, processing local screen data and writing it to buffer 214, and monitors media server 206 for a read pointer directed to ScreenCap file. In either case, whether at initialization or upon activation by a server read pointer directed to ScreenCap file, controller 212 provides control information to processing module 210 thereby causing it to process local screen data from display 202 and write the processed local screen data to buffer 214.

As the sink device begins transmitting requests for the content of ScreenCap file (e.g., by issuing GET commands), media server 206 begins providing subsequent server read pointers to system 204. Controller 212 interprets these read pointers to control the manner in which processed local screen data is written to buffer 214 and the manner in which the data is read from buffer 214. This involves controlling the operation of processing module 210, as well as the operation of an internal write pointer and an internal read pointer associated with buffer 214. In general, based upon the frequency of the requests for content from the sink device (and the corresponding read pointers from server 206), controller 212 maintains a desired latency between processed local screen data written to buffer 214 and processed local screen data read from buffer 214. The manner in which controller 212 manages processing module 210 and the read and write pointers of buffer 214 is described in further detail below.

Figure 3:
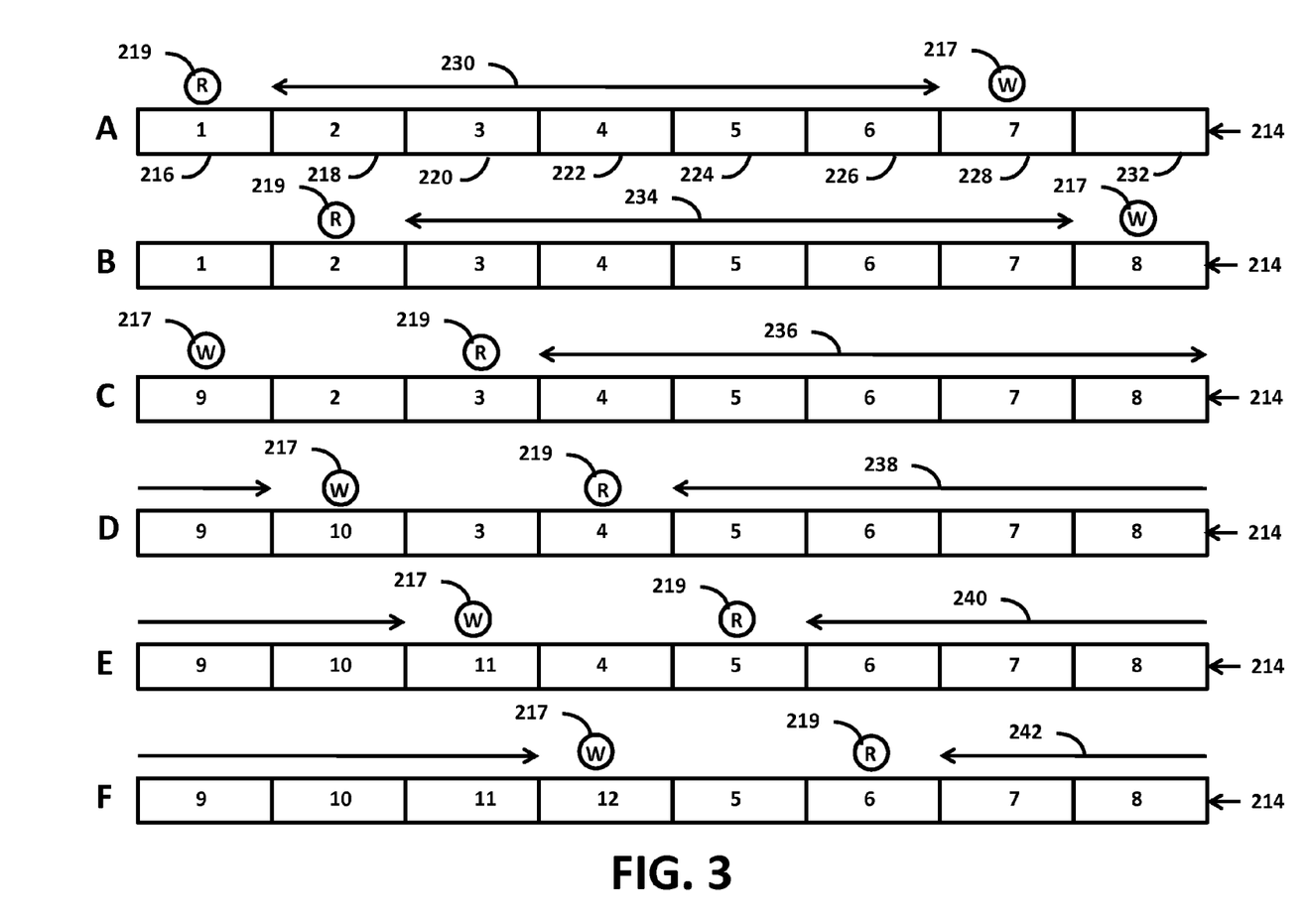
FIGS. 3-5 are conceptual diagrams of a circular buffer under different circumstances of providing local screen data to a sink device.
Figure 4:
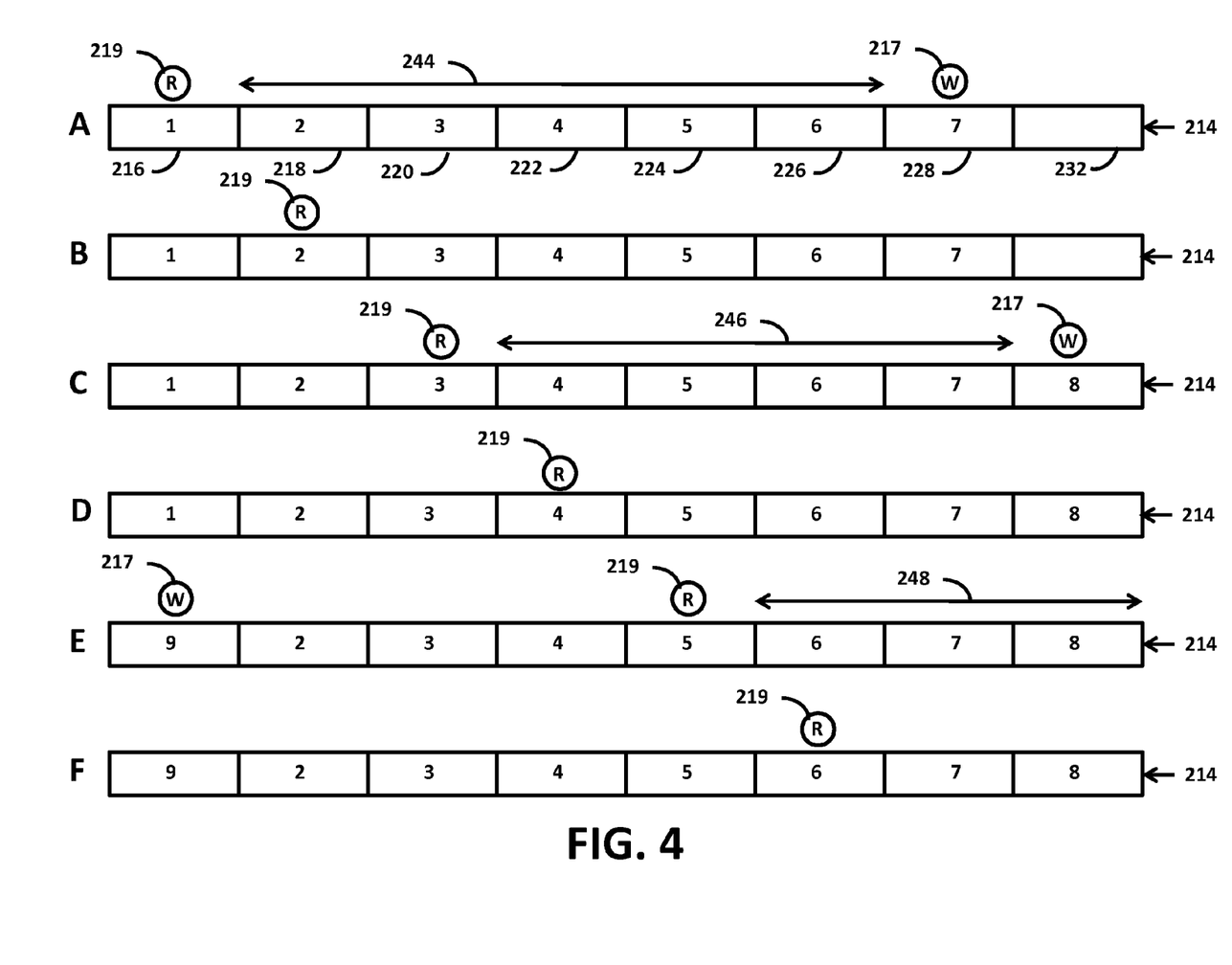
Figure 5:
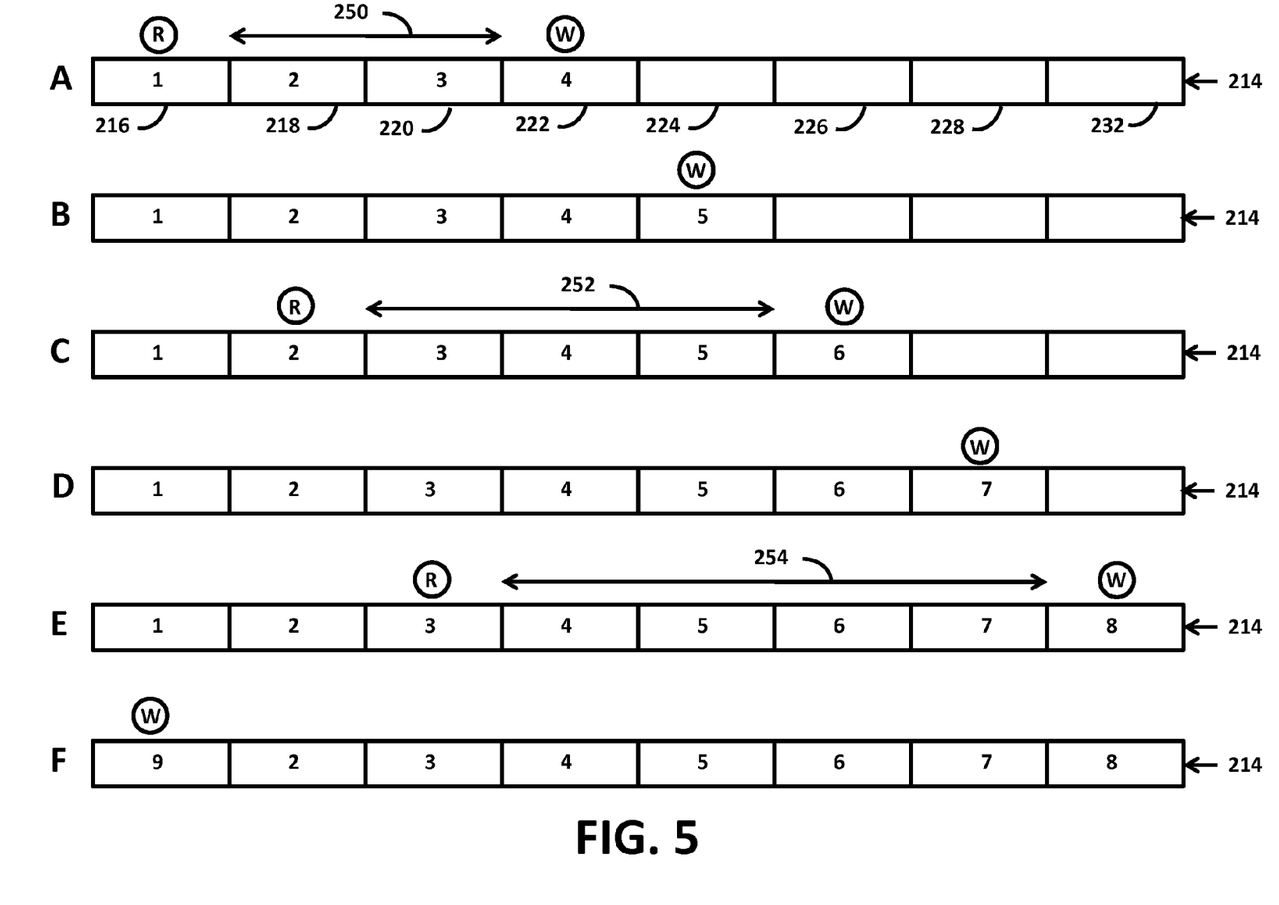

FIGS. 3-5 provide conceptual depictions of buffer 214 under different circumstances during operation of system 204. In FIG. 3, a desired latency is maintained between local screen data written to buffer 214 and local screen data read from buffer 214. More specifically, in FIG. 3A buffer 214 has been populated with seven frames of processed local screen data, sequentially stored in locations 216, 218, 220, 222, 224, 226, and 228. Additionally, write pointer 217 of FIG. 3A shows that frame 7 is written to location 228 at the same time read pointer 219 indicates that frame 1 is read from location 216. This represents a latency between read pointer 219 (frame 1) and write pointer 217 (frame 7) of five frames as indicated by arrow 230. In FIG. 3B, frame 8 is written to location 232 and frame 2 (the next available frame of processed local screen data stored in buffer 214) is read from location 218. Again, a latency of five frames is maintained as indicated by arrow 234. In FIG. 3C, frame 3 is read from location 220 and frame 9 is written to location 216, overwriting the oldest frame of data (frame 1) stored in buffer 214. A latency of five frames is maintained as indicated by arrow 236. As shown in FIGS. 3D-F, read pointer 219 is sequentially incremented through locations 222, 224, and 226 as write pointer 217 is sequentially incremented through locations 218, 220, and 222 at the same rate. By controlling read pointer 219 and write pointer 217 in this manner, controller 212 of system 204 maintains a desired latency of five frames between data read from buffer 214 and data written to buffer 214 (see arrows 238, 240, and 242).

FIG. 4 depicts buffer 214 under circumstances wherein the rate of consumption of the sink device is faster than the current rate at which frames of local screen data are written to buffer 214. As shown, the desired latency of five frames is not being maintained. More specifically, FIG. 4A is identical the FIG. 3A, depicting a latency of five frames as indicated by arrow 244. In FIG. 4B, however, controller 212 has incremented read pointer 219 to location 218 in response to another request for local screen data from the sink device, which it receives as a read pointer from media server 206. As explained above, the requests for local screen data from the sink device are at a rate of consumption determined by the sink device. Under the conditions shown, at the time read pointer 219 is incremented to location 218, a write operation to buffer 214 is not yet scheduled. In FIG. 4C, controller 212 has again incremented read pointer 219 in response to a request from the sink device. Controller 212 has also caused processing module 210 to write frame 8 to location 232 as indicated by write pointer 217. However, because of the rate of consumption required by the sink device, the latency between read pointer 219 and write pointer 217 has reduced to four frames of local screen data as indicated by arrow 246. As shown in FIGS. 4D-F, read pointer 219 is continuously incremented at the rate required by the sink device, but write pointer 217 is only incremented at FIG. 4E, where the latency has reduced to three frames as indicated by arrow 248. Controller 212 manages a situation as depicted in FIG. 4 by increasing the rate at which frames of local screen data are written to buffer 214 by processing module 210. For example, upon detecting a reduction in latency as depicted in FIG. 4, controller 212 may provide control information to processing module 210 which commands processing module 210 to increase frame processing from 40 frames per second to 50 frames per second to thereby maintain the desired latency.

FIG. 5 depicts buffer 214 under circumstances wherein the rate of consumption of the sink device is slower than the current rate at which frames of local screen data are written to buffer 214. As shown, the initial desired latency of two frames is not being maintained. More specifically, in FIG. 5A, frames 1 through 3 have previously been written to locations 216, 218, and 220, respectively. Frame 4 is written to location 222 as indicated by write pointer 217 at the same time frame 1 is read from location 216 as indicated by read pointer 219. The latency between read pointer 219 and write pointer 217 is two frames as indicated by arrow 250. Controller 212 continues to increment write pointer 217 at a constant rate as depicted in FIGS. 5B-F. Requests for local screen data from the sink device, however, are being received at a slower rate determined by the sink device. As such, read pointer 219 is only incremented in FIGS. 5C and 5E, and the latency between read pointer 219 and write pointer 217 increases to three frames in FIG. 5C (arrow 252) and four frames in FIG. 5E (arrow 254). Controller manages a situation as depicted in FIG. 5 by decreasing the rate at which frames of local screen data are written to buffer 214 by processing module 210. For example, controller 212 may provide control information to processing module 210 which commands processing module 210 to decrease frame processing from 50 frames per second to 40 frames per second to thereby maintain the desired latency.

Alternatively, or in addition, controller 212 may respond to requests for local screen data from the sink device by skipping one or more frames stored in buffer 214. More specifically, in FIG. 5C, rather than incrementing read pointer 219 from location 216 (FIG. 5A) to location 218, controller 212 may skip frame 2 and increment read pointer 219 to location 220 to maintain the desired latency of two frames. In other words, controller 212 may continue writing data to buffer 214 at a constant rate, and control read pointer 219 so that the local screen data read by media server 206 remains current, and substantially live rather than falling behind by more than the desired latency.

As will be understood by those skilled in the art, in an implementation wherein frames of local screen data are skipped by controller 212 in the manner described above, controller 212 must also ensure that the frame to which read pointer 219 is incremented is a frame that can be decoded by the sink device. As is known in the art, certain compression schemes only produce fully decodable frames of data periodically, and the frames between the fully decodable frames are dependent upon the preceding fully decodable frame, and any intervening frames. For example, many video compression algorithms employ picture types or frame types, including I-frames, P-frames and B-frames. I-frames are generally the least compressed and may be decoded independent of other frames in the stream. P-frames are more compressed than I-frames, and require use of data from previous frames for decompression. B-frames are the most compressed, and require use of data from previous frames and subsequent frames for decompression.

If processing module 210 is using such a compression algorithm, controller 212 can only increment read pointer 219 to certain locations in buffer 214 (i.e., locations containing I-frames) to be certain the frame provided to the sink device may be decoded. Under some modes of operation, I-frames may be written to buffer 214 only once per second. Without managing the processing and writing of local screen data to buffer 214, in a situation as depicted in FIG. 5, controller 212 may need to skip nearly an entire second of data to point read pointer 219 to a fully decodable frame. As such lengthy discontinuities in local screen data are undesirable, controller 212 may employ an algorithm wherein it detects situations wherein read pointer 219 will need to be incremented by more than one frame to comply with the rate of consumption demanded by the sink device. When such situations are detected, controller 212 provides control information to processing module 210 commanding processing module 210 to generate I-frames more frequently so that when read pointer 219 needs to be incremented to maintain the desired latency, an I-frame is available in buffer 214 that represents a discontinuity of local screen data of an acceptable amount (e.g., a fraction of one second). By dynamically controlling processing module 210 in this manner, controller 212 enhances the quality of local screen data served to the sink device while also complying with the rate of consumption demanded by the sink device.

Figure 6:
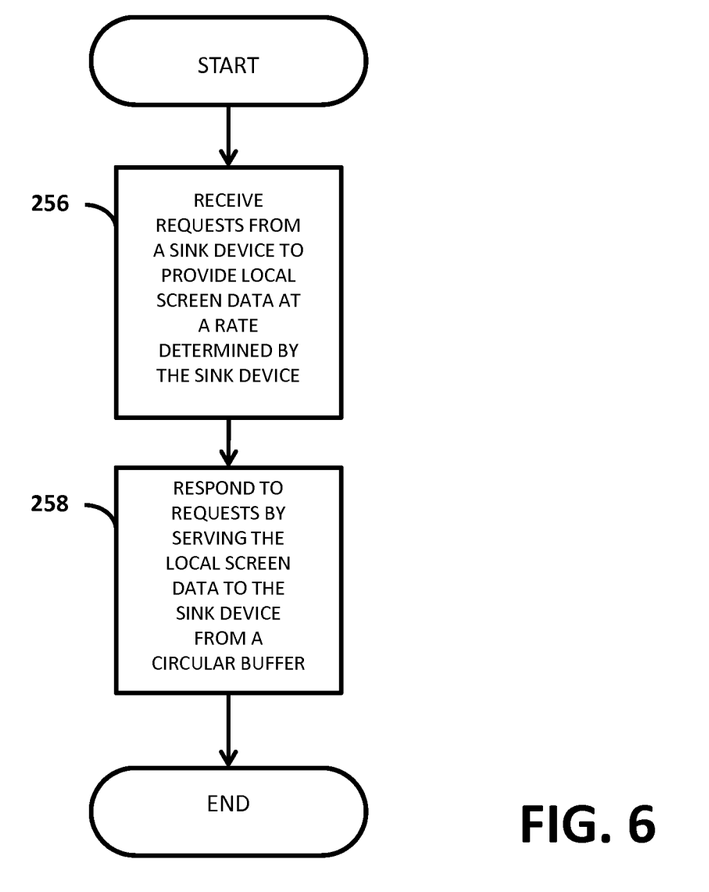
FIG. 6 is a flowchart illustrating one example of a method for providing local screen data to a sink device in accordance with one embodiment set forth in the disclosure.

Referring now to FIG. 6, a method of providing local screen data to a sink device is depicted in flowchart form. In operation, at block 256, source device 200 receives requests from the sink device to provide local screen data at a rate determined by the sink device. At block 258, source device 200 responds to the requests by serving the local screen data to the sink device from circular buffer 214. Block 258 is further illustrated in FIG. 7.

Figure 7:
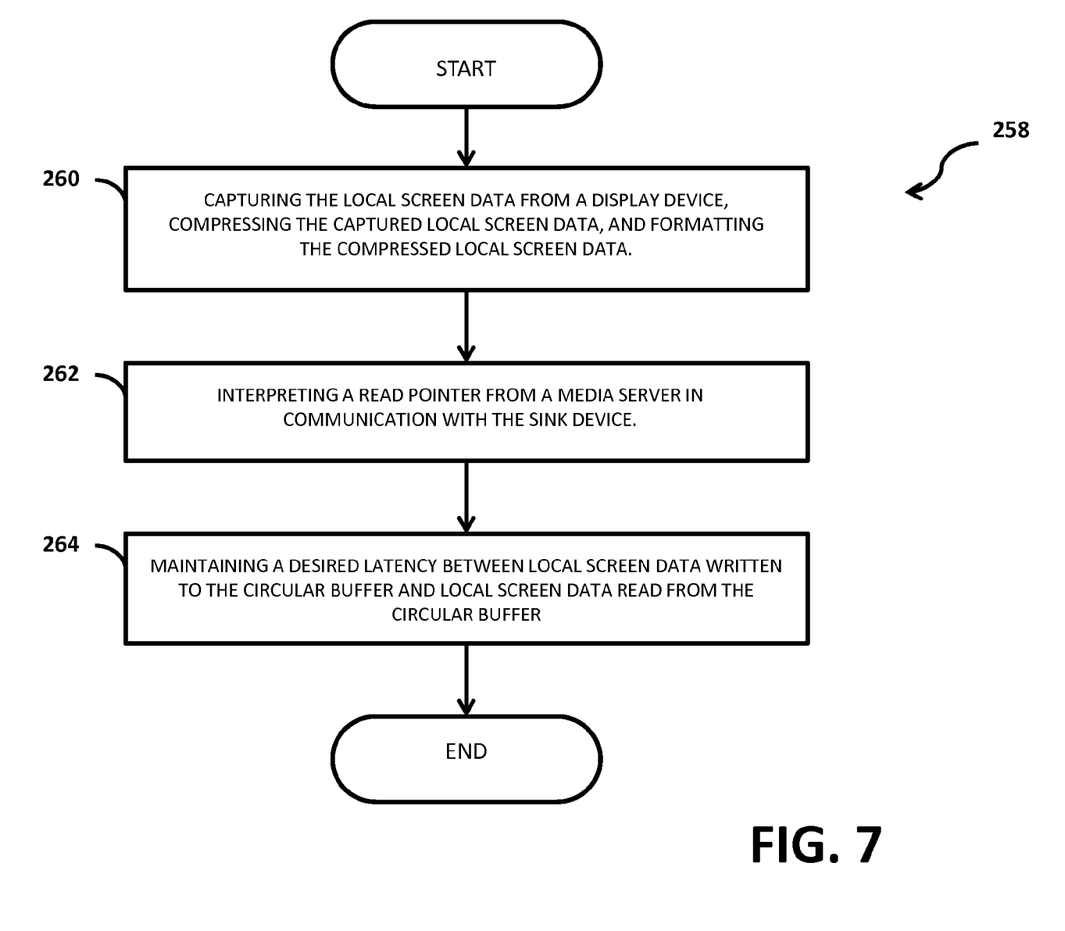
FIG. 7 is a more detailed flowchart illustrating the example shown in FIG. 6.

Referring to FIG. 7, in operation, at block 260, controller 212 causes processing module 210 to capture local screen data from display 202, compress the captured local screen data according to one of a plurality of compression techniques, and format the compressed local screen data according to one of a plurality of formatting standards. At block 262, controller 212 interprets the read pointer from media server 206, which is in communication with the sink device. At block 264, controller 202 manages the operation of processing module 210, read pointer 219 and write pointer 217 in the manner described above to maintain a desired latency between local screen data written to buffer 214 and local screen data read from buffer 214. Block 264 is further illustrated in FIG. 8. Block 262 is further illustrated in FIG. 10.

Figure 8:
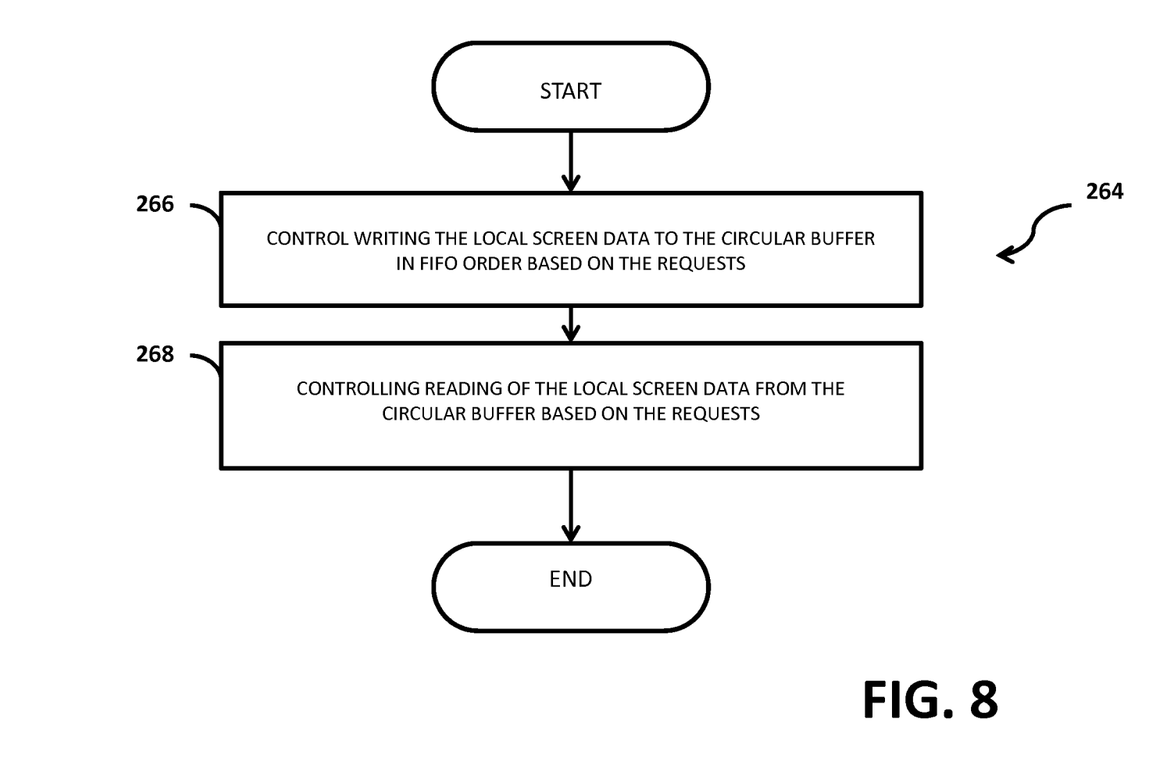
FIG. 8 is a flowchart illustrating in more detail a portion of the flowchart shown in FIG. 7.

Referring to FIG. 8, block 266 represents the operation of controller 212 in controlling processing module 210 and write pointer 217. More specifically, controller 212 controls the writing of local screen data to buffer 214 in FIFO order based on requests for local screen data from the sink device. Controlling the writing of local screen data to buffer 214 encompasses the control over the rate at which write pointer 217 is incremented (e.g., as described above with reference to FIGS. 4 and 5) to maintain a desired latency between read pointer 219 and write pointer 217, as well as the control over the manner in which processing module 210 processes local screen data (e.g., as described above with reference to an increased frequency of I-frames). Block 268 represents the operation of controller 212 in controlling read pointer 219. More specifically, controller 212 controls the reading of local screen data from buffer 214 based on requests for local screen data from the sink device. Controlling the reading of local screen data from buffer 214 encompasses the control over the rate at which read pointer 219 is incremented (e.g., as described above with reference to frame skipping) to maintain a desired latency between read pointer 219 and write pointer 217. Block 266 is further illustrated in FIG. 9.

Figure 9:
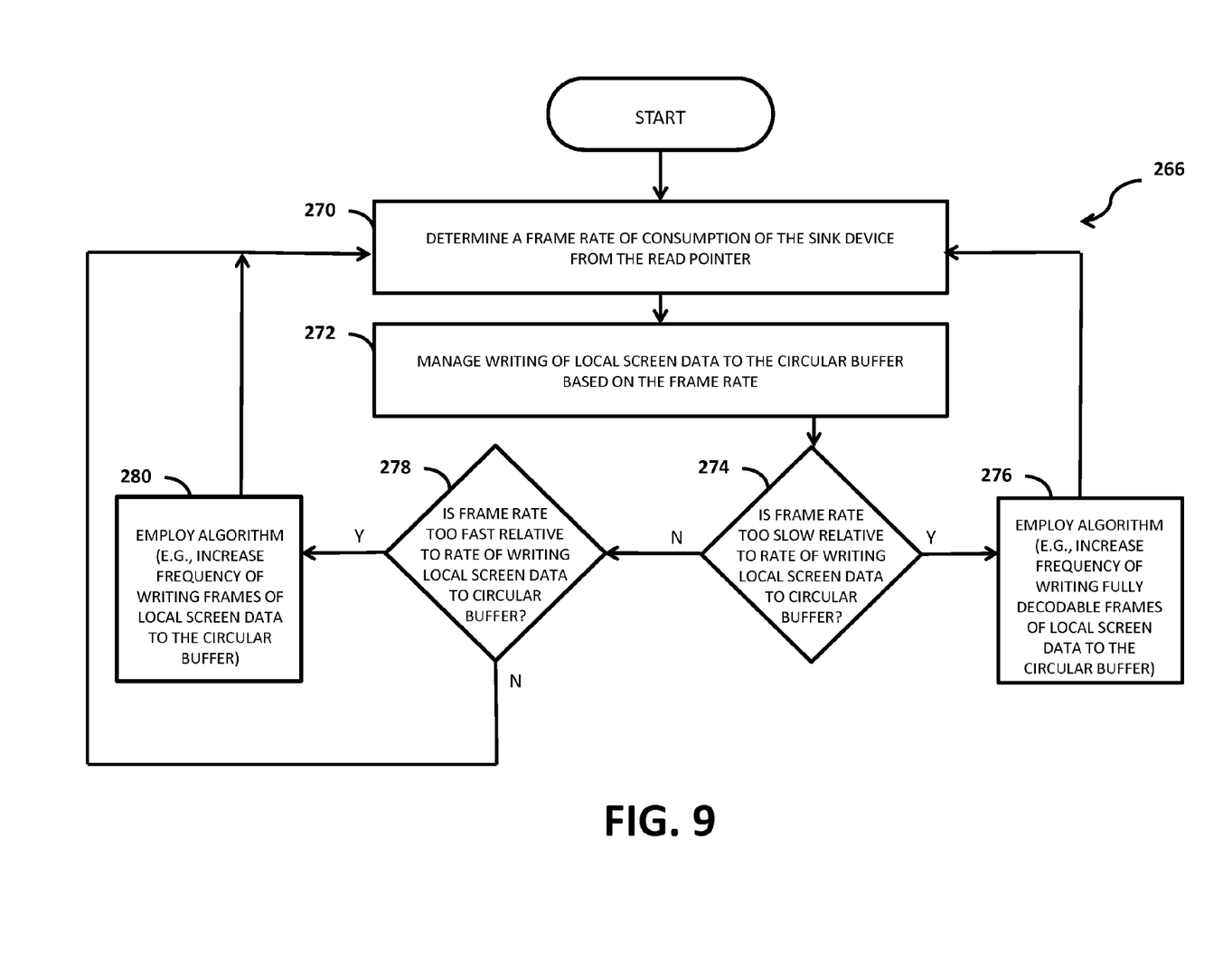
FIG. 9 is a flowchart illustrating in more detail a portion of the flowchart shown in FIG. 8.

Referring to FIG. 9, at block 270 controller 212 determines a frame rate of consumption of the sink device from the server read pointers provided by media server 206. At block 272, controller 212 manages the writing of local screen data to buffer 214 based on the determined rate of consumption of the sink device. Block 274 represents a determination by controller 212 whether the frame rate of consumption demanded by the sink device is too slow relative to the rate at which local screen data is currently written to buffer 214. If the frame rate is too slow, then controller 212 may employ one of a plurality of algorithms to accommodate the sink device's rate of consumption as indicated by block 276. For example, as described above, controller 212 may command processing module 210 to increase the frequency of fully decodable frames of local screen data written to buffer 214 in anticipation of a need to skip frames provided by read pointer 219. Alternatively, or in addition, controller 212 may cause a decrease in the rate at which data is written to buffer 214. If the frame rate at block 274 is not too slow, then controller 212 may determine at block 278 whether the frame rate is too fast relative to the rate at which local screen data is currently written to buffer 214. If the frame rate is too fast, then controller may employ one of a plurality of algorithms to accommodate the sink device's rate of consumption as indicated by block 280. For example, as described above, controller 212 may command processing module 210 to increase the frequency of writing frames of local screen data to buffer 214. If controller 212 determines that the frame rate demanded by the sink device is neither too slow nor too fast, then controller 212 may continue to monitor the frame rate indicated by the read pointer from media server 206.

Figure 10:
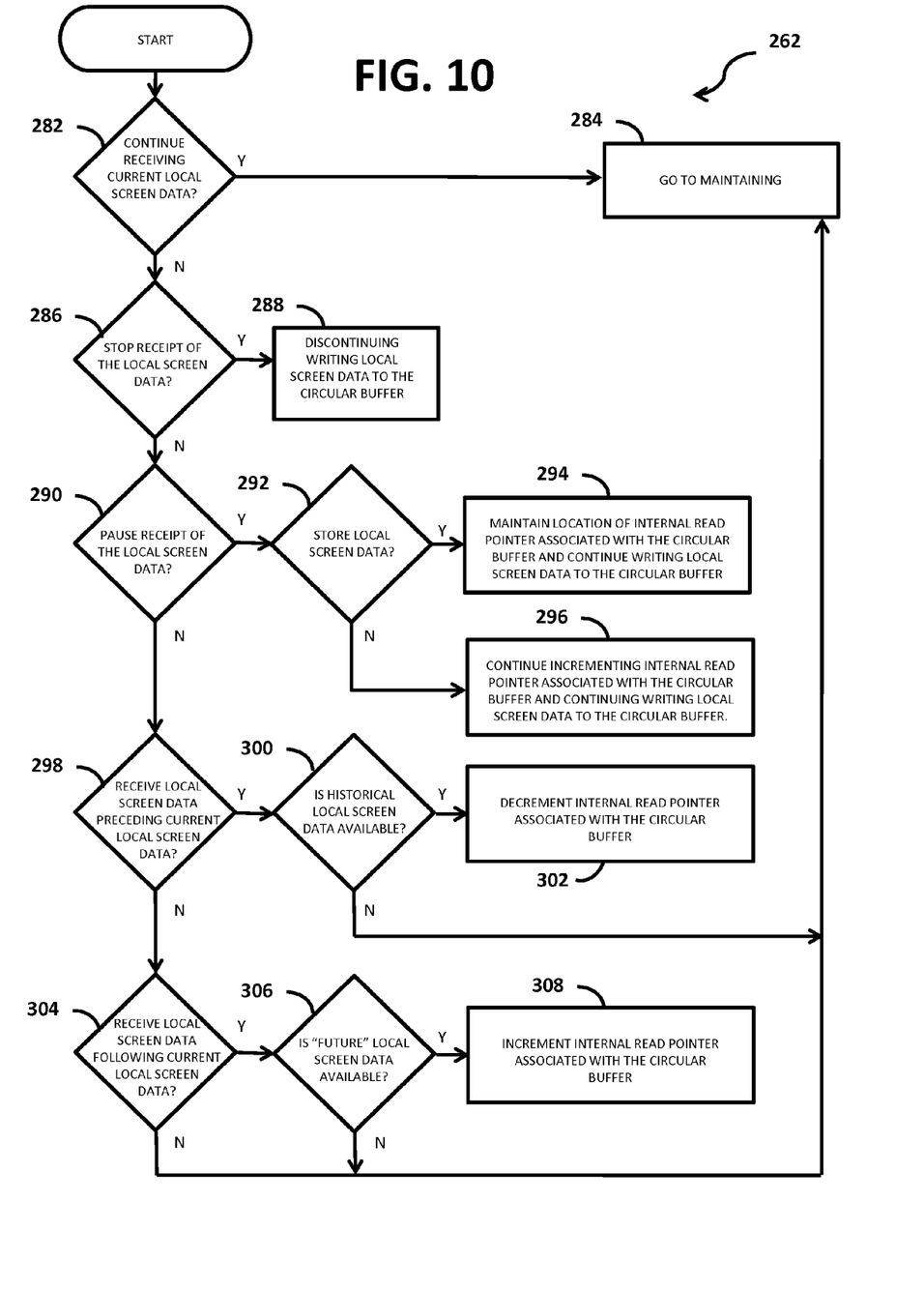
FIG. 10 is a flowchart illustrating one example of a method for interpreting a read pointer in accordance with one embodiment set forth in the disclosure.

Referring now to FIG. 10, an example of the manner in which system 204 may interpret the read pointer from media server 206 is depicted in flowchart form. Block 282 represents normal streaming operation wherein the sink device provides sequential requests for local screen data, media server 206 in turn provides sequential server read pointers, and system 204 provides local screen data from buffer 214 in the manner described above. As long as system 204 continues receiving requests for local screen data, the outcome of block 282 is "Y" and system 204 operates to maintain the desired latency at block 284 as depicted in FIG. 8. By interpreting the read pointers from media server 206, controller 212 may determine that the sink device has requested to stop receiving local screen data, to pause receipt of local screen data, to receive local screen data preceding the current local screen data, or to receive local screen data following the current local screen data. At block 286, controller 212 determines whether the sink device has requested to stop receiving local screen data. If it has, then controller 212 discontinues writing local screen data to buffer 214 as indicated by block 288. If not, then controller 212 determines at block 290 whether the sink device has requested a pause in receipt of local screen data.

If a pause is requested, then controller 212 may, depending upon the embodiment of system 204 implemented in source device 200, be configured to store historical data in buffer 214. More specifically, in some embodiments, buffer 214 may be configured to store local screen data well in excess of the relatively small number of frames needed to permit controller 212 to maintain the desired latency of local screen data provided to the sink device. If such an embodiment is employed, then the outcome of block 292 is "Y," and system 204 may function in a manner similar to a DVR, by maintaining the location of read pointer 219 and continuing to write local screen data to buffer 214. This requires a substantially larger capacity buffer 214. When the pause request from the sink device is removed, controller 212 will begin providing local screen data corresponding to the location of read pointer 219 at the beginning of the pause. Of course, as local screen data is, by definition, substantially live content, the data provided when the pause is removed will be delayed, or time shifted so as to no longer meet the definition of local screen data provided herein. This data is referred to herein as historical local screen data.

Alternatively, if an embodiment of system 204 is employed that does not support storage of historical local screen data (such as the embodiments described above with reference to FIGS. 3-5), the outcome of block 292 is "N," and controller 212 continues incrementing read pointer 219 and write pointer 217 in the manner described above as indicated by block 296. Media server 206, however, does not serve local screen data to the sink device during a pause as it does not receive requests for local screen data from the sink device. When the pause request is removed, system 204 responds to the next request for local screen data by providing the local screen data at the current location of read pointer 219, which corresponds to substantially live local screen data. As such, the sink device cannot receive the local screen data processed by system 204 during the pause.

If a pause is not requested, controller 212 determines whether the sink device has requested to receive local screen data preceding the current local screen data (i.e., the sink device has provided a rewind request). Again, the response of system 204 is dependent upon the implementation selected. If system 204 is implemented with a large buffer 214, or a buffer 214 that can be increased in capacity, then controller 212 determines at block 300 that historical local screen data is available. As such, controller 212 responds to the rewind request by decrementing read pointer 219 to a location corresponding to the rewind request, or to the oldest historical local screen data available in buffer 214 if the rewind request corresponds to a rewind that exceeds the amount of historical local screen data stored in buffer 214. Alternatively, in embodiments of system 204 that do not support storage of historical screen data, the outcome of block 300 is "N," and controller 212 simply ignores the rewind request and continues normal operation as indicated by block 284.

At block 304, controller 212 determines whether the sink device has requested to receive local screen data following the current local screen data (i.e., the sink device has provided a fast-forward request). Again, the response of system 204 is dependent upon the implementation selected. If the embodiment of system 204 does not support rewind requests, then it cannot support fast-forward requests. In other words, a fast-forward request can only be supported after system 204 has responded to a rewind request. This is because, under normal operation, system 204 provides local screen data substantially as it occurs on display 202. A fast-forward request from the sink device during normal operation of system 204 cannot be supported as no local screen data following the current local screen data exists. As such, the outcome of block 306 is "N," and controller 212 simply ignores the rewind request and continues normal operation as indicated by block 284. On the other hand, if the embodiment employed supports rewind requests and system 204 has previously responded to a rewind request (i.e., historical local screen data is being provided from buffer 214 at the time of the fast-forward request), then "future" local screen data is available, and the outcome of block 306 is "Y." As such, as indicated by block 308, controller 212 responds to the fast-forward request by incrementing read pointer 219 to a location of buffer 214 corresponding to the fast-forward request, or to the current, live local screen data available in buffer 214 if the fast-forward request corresponds to a fast-forward beyond live local screen data.

Among other advantages, for example, the method and apparatus provides the ability to provide local screen data to a vast number of legacy sink devices which could not otherwise receive local screen data because the communication protocol they use requires receipt of content at a consumption rate determined by the sink devices. While such legacy sink devices can receive media files from source devices at consumption rates determined by the sink devices (i.e., in the pull model), they cannot receive local screen data using conventional techniques. The method and apparatus further permits, in certain embodiments, flexibility of playback by supporting multiple playback modes as described above. Other advantages will be recognized by those of ordinary skill in the art.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method of providing local screen data to a sink device, comprising:
   responding to content requests from the sink device to provide local screen data at a rate determined by the sink device by serving the local screen data to the sink device from a circular buffer and by interpreting a read pointer provided by a media server in communication with the sink device in response to the content requests;
   wherein serving the local screen data comprises maintaining a desired latency between local screen data written to the circular buffer and local screen data read from the circular buffer; and
   wherein interpreting a read pointer comprises determining whether a request has been made to continue receiving current local screen data, stop receipt of the local screen data, pause receipt of the local screen data, receive local screen data preceding the current local screen data, or receive local screen data following the current local screen data.

2. The method of claim 1, wherein responding to content requests further comprises:
   controlling writing the local screen data to the circular buffer in FIFO order based on the content requests; and controlling reading of the local screen data from the circular buffer based on the content requests.

3. The method of claim 1, wherein responding to content requests further comprises capturing the local screen data from a display device, compressing the captured local screen data, and formatting the compressed local screen data.

4. The method of claim 1, wherein interpreting a read pointer comprises responding to a request to stop receipt of the local screen data by discontinuing writing local screen data to the circular buffer.

5. The method of claim 1, wherein interpreting a read pointer comprises responding to a request to pause receipt of the local screen data by continuing to increment an internal read pointer associated with the circular buffer and continuing to write local screen data to the circular buffer.

6. The method of claim 1, wherein interpreting a read pointer comprises responding to a request to pause receipt of the local screen data by maintaining a location of an internal read pointer associated with the circular buffer and continuing to write local screen data to the circular buffer.

7. The method of claim 1, wherein interpreting a read pointer comprises responding to a request to receive local screen data preceding the current local screen data by decrementing an internal read pointer associated with the circular buffer.

8. The method of claim 1, wherein interpreting a read pointer comprises responding to a request to receive local data following the current local screen data by incrementing an internal read pointer associated with the circular buffer.

9. The method of claim 1, wherein interpreting a read pointer comprises:
determining a frame rate of consumption of the sink device from the read pointer; and
managing writing of local screen data to the circular buffer based on the frame rate.

10. The method of claim 9, wherein managing writing of local screen data comprises increasing the frequency of writing fully decodable frames of local screen data to the circular buffer.

11. A non-transitory computer-readable storage medium storing instructions that, when executed by a processor in a source device, cause the processor to:
respond to content requests from a sink device to provide local screen data at a rate determined by the sink device by serving the local screen data to the sink device from a circular buffer;
capture the local screen data from a display device, compress the captured local screen data, and format the compressed local screen data; and
determine whether the sink device has requested to continue receiving current local screen data, stop receipt of the local screen data, pause receipt of the local screen data, receive local screen data preceding the current local screen data, or receive local screen data following the current local screen data.

12. The non-transitory computer-readable storage medium of claim 11, wherein the instructions, when executed by the processor, further cause the processor to:
control writing the local screen data to the circular buffer in FIFO order based on the content requests; and
control reading of the local screen data from the circular buffer based on the content requests.

13. The non-transitory computer-readable storage medium of claim 11, wherein the instructions, when executed by the processor, further cause the processor to:
maintain a desired latency between local screen data written to the circular buffer and local screen data read from the circular buffer.

14. The non-transitory computer-readable storage medium of claim 11, wherein the instructions, when executed by the processor, further cause the processor to:
interpret a read pointer provided by a media server in communication with the sink device in response to the content requests.

15. The non-transitory computer-readable storage medium of claim 14, wherein the instructions, when executed by the processor to interpret the read pointer, further cause the processor to:
determine a frame rate of consumption of the sink device from the read pointer; and
manage writing of local screen data to the circular buffer based on the frame rate.

16. The non-transitory computer-readable storage medium of claim 15, wherein the instructions, when executed by the processor to manage writing of local screen data to the circular buffer, further cause the processor to:
increase the frequency of writing fully decodable frames of local screen data to the circular buffer.

17. An apparatus for providing local screen data to a sink device, comprising:
a local screen data control system including
a circular buffer,
a controller operative to respond to content requests from the sink device to provide local screen data at a rate determined by the sink device by making the local screen data available to the sink device from a circular buffer and by interpreting a read pointer provided by a media server in communication with the sink device in response to the content requests, and
a processing module operative to capture the local screen data from a display device, compress the captured local screen data, and format the compressed local screen data;
wherein the controller is further operative to interpret the read pointer by determining whether the sink device has requested to continue receiving current local screen data, stop receipt of the local screen data, pause receipt of the local screen data, receive local screen data preceding the current local screen data, or receive local screen data following the current local screen data.

18. The apparatus of claim 17, wherein the controller is further operative to control writing of the local screen data from the processing module to the circular buffer in FIFO order based on the content requests, and
control reading of the local screen data from the circular buffer based on the content requests.

19. The apparatus of claim 17, wherein the controller is further operative to maintain a desired latency between local screen data written to the circular buffer and local screen data made available to the sink device from the circular buffer.

20. The apparatus of claim 17, wherein the controller is further operative to interpret the read pointer by determining a frame rate of consumption of the sink device from the read pointer, and managing writing of local screen data from the processing module to the circular buffer based on the frame rate.

* * * * *